(12) United States Patent
Yamaguchi

(10) Patent No.: US 8,325,366 B2
(45) Date of Patent: Dec. 4, 2012

(54) IMAGE FORMING SYSTEM AND IMAGE FORMING APPARATUS

(75) Inventor: Tetsuji Yamaguchi, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 901 days.

(21) Appl. No.: 12/423,310

(22) Filed: Apr. 14, 2009

(65) Prior Publication Data

US 2010/0020353 A1 Jan. 28, 2010

(30) Foreign Application Priority Data

Jul. 22, 2008 (JP) .................................. 2008-188229

(51) Int. Cl.
*G06F 3/12* (2006.01)
(52) U.S. Cl. ...................................................... 358/1.15
(58) Field of Classification Search ........................ None
See application file for complete search history.

(56) References Cited

U.S. PATENT DOCUMENTS

| | | | | |
|---|---|---|---|---|
| 6,952,279 | B1 * | 10/2005 | Iida ............................... | 358/1.15 |
| 7,752,288 | B2 * | 7/2010 | Mihira et al. .................. | 709/221 |
| 7,774,711 | B2 * | 8/2010 | Valeski .......................... | 715/752 |
| 8,028,244 | B2 * | 9/2011 | Takahashi et al. ............ | 715/772 |
| 2002/0107937 | A1 | 8/2002 | Iyoki | |
| 2007/0071194 | A1 * | 3/2007 | Nogawa .................... | 379/100.17 |
| 2008/0148288 | A1 | 6/2008 | Kaneda | |
| 2009/0064289 | A1 * | 3/2009 | Jang ................................. | 726/4 |

FOREIGN PATENT DOCUMENTS

| | | |
|---|---|---|
| JP | 2002-232637 | 8/2002 |
| JP | 2007-013886 | 1/2007 |
| JP | 2007-027963 | 2/2007 |
| JP | 2007-312335 | 11/2007 |
| JP | 2008-118465 | 5/2008 |
| JP | 2008-146578 | 6/2008 |

* cited by examiner

*Primary Examiner* — Marivelisse Santiago Cordero
*Assistant Examiner* — John Wallace
(74) *Attorney, Agent, or Firm* — K&L Gates LLP

(57) ABSTRACT

An image forming apparatus including: a data storage device that stores a user registration information item and/or user group registration information item as address book data; a communication processing section that receives a registration request message described in XML so as to include a plurality of user registration information items and/or user group registration information items; a SOAP processing section that extracts, when the communication processing section receives the registration request message from a client apparatus, each of the plurality of user registration information items and/or user group registration information items that are specified in the registration request message; and a control section that registers the user registration information item and/or user group registration information item that are extracted from the SOAP processing section in the address book data.

14 Claims, 7 Drawing Sheets

```
<soapenv:Envelope
xmlns:soapenv="http://schemas.xmlsoap.org/soap/envelope/">
  <soapenv:Body>
    <m:setAddressBookRequest xmlns:m="http://www.xxxx.com">
      <m:Address>
        <m:User>
          <m:UserID>0101</m:UserID>
          <m:UserName>TARO (IN KANJI CHARACTERS)</m:UserName>
          <m:UserNameKana>TA-RO (IN KATAKANA CHARACTERS)</m:UserNameKana>
          <m:EmailAddress>taro@xxx.com</m:EmailAddress>
          <m:FTPpath>/taro/</m:FTPpath>
          <m:FTPserver>xxx.xxx.xxx.xxx</m:FTPserver>
          <m:FTPloginName>taro</m:FTPloginName>
          <m:FTPloginPassword>******</m:FTPloginPassword>
          <m:SMBpath>/taro/</m:SMBpath>
          <m:SMBserver>xxx.xxx.xxx.xxx</m:SMBserver>
          <m:SMBloginName>taro</m:SMBloginName>
          <m:SMBloginPassword>******</m:SMBloginPassword>
          <m:FacsimileNumber>xx-xxxx-xxxx</m:FacsimileNumber>
          <m:FacsimileRate>Auto</m:FacsimileRate>
        </m:User>
        ...
      </m:Address>
      <m:Group>
        <m:GroupInfo>
          <m:GroupID>01</m:GroupID>
          <m:UserID>0101</m:UserID>
          <m:UserID>0102</m:UserID>
          <m:UserID>0103</m:UserID>
          <m:UserID>0104</m:UserID>
        </m:GroupInfo>
        ...
      </m:Group>
    </m:setAddressBookRequest>
  </soapenv:Body>
</soapenv:Envelope>
```

FIG. 3

```
<soapenv:Envelope
xmlns:soapenv="http://schemas.xmlsoap.org/soap/envelope/">
  <soapenv:Body>
    <m:setAddressBookRequest xmlns:m="http://www.xxxx.com">
     <m:Address>
      <m:User>
        <m:UserID>0101</m:UserID>
        <m:UserName>TARO (IN KANJI CHARACTERS)</m:UserName>
        <m:UserNameKana>TA-RO (IN KATAKANA CHARACTERS)</m:UserNameKana>
        <m:EmailAddress>taro@xxx.com</m:EmailAddress>
        <m:FTPpath>/taro/</m:FTPpath>
        <m:FTPserver>xxx.xxx.xxx.xxx</m:FTPserver>
        <m:FTPloginName>taro</m:FTPloginName>
        <m:FTPloginPassword>******</m:FTPloginPassword>
        <m:SMBpath>/taro/</m:SMBpath>
        <m:SMBserver>xxx.xxx.xxx.xxx</m:SMBserver>
        <m:SMBloginName>taro</m:SMBloginName>
        <m:SMBloginPassword>******</m:SMBloginPassword>
        <m:FacsimileNumber>xx-xxxx-xxxx</m:FacsimileNumber>
        <m:FacsimileRate>Auto</m:FacsimileRate>
      </m:User>

...

</m:Address>
     <m:Group>
       <m:GroupInfo>
         <m:GroupID>01</m:GroupID>
         <m:UserID>0101</m:UserID>
         <m:UserID>0102</m:UserID>
         <m:UserID>0103</m:UserID>
         <m:UserID>0104</m:UserID>
       </m:GroupInfo>

...

</m:Group>
    </m:setAddressBookRequest >
  </soapenv:Body>
</soapenv:Envelope>
```

FIG. 6

```
<soapenv:Envelope
xmlns:soapenv="http://schemas.xmlsoap.org/soap/envelope/">
  <soapenv:Body>
    <m:setAddressRequest xmlns:m="http://www.xxxx.com">
      <m:User>
        <m:UserID>0101</m:UserID>
        <m:UserName>TARO (IN KANJI CHARACTERS)</m:UserName>
        <m:UserNameKana>TA-RO (IN KATAKANA CHARACTERS)</m:UserNameKana>
        <m:EmailAddress>taro@xxx.com</m:EmailAddress>
        <m:FTPpath>/taro/</m:FTPpath>
        <m:FTPserver>xxx.xxx.xxx.xxx</m:FTPserver>
        <m:FTPloginName>taro</m:FTPloginName>
        <m:FTPloginPassword>******</m:FTPloginPassword>
        <m:SMBpath>/taro/</m:SMBpath>
        <m:SMBserver>xxx.xxx.xxx.xxx</m:SMBserver>
        <m:SMBloginName>taro</m:SMBloginName>
        <m:SMBloginPassword>******</m:SMBloginPassword>
        <m:FacsimileNumber>xx-xxxx-xxxx</m:FacsimileNumber>
        <m:FacsimileRate>Auto</m:FacsimileRate>
      </m:User>

...

</m:setAddressRequest>
  </soapenv:Body>
</soapenv:Envelope>
```

FIG. 7

```
<soapenv:Envelope
xmlns:soapenv="http://schemas.xmlsoap.org/soap/envelope/">
  <soapenv:Body>
    <m:setGroupRequest xmlns:m="http://www.xxxx.com">
      <m:GroupInfo>
        <m:GroupID>01</m:GroupID>
        <m:UserID>0101</m:UserID>
        <m:UserID>0102</m:UserID>
        <m:UserID>0103</m:UserID>
        <m:UserID>0104</m:UserID>
      </m:GroupInfo>

...

</m:setGroupRequest>
  </soapenv:Body>
</soapenv:Envelope>
```

IMAGE FORMING SYSTEM AND IMAGE FORMING APPARATUS

INCORPORATION BY REFERENCE

This application is based upon and claims the benefit of priority from the corresponding Japanese Patent Application No. 2008-188229, filed Jul. 22, 2008, the entire contents of which is incorporated herein by reference.

BACKGROUND

1. Field of the Invention

The present invention relates to an image forming system and an image forming apparatus.

2. Description of the Related Art

It is known to provide image forming apparatus wherein the destination for a facsimile transmission, email transmission, file transfer, or the like is identified with reference to address book data, and various kinds of data that are transmitted to the destination. The address book data includes a plurality of attribute information items on each user. In recent years, image forming apparatuses, such as a multifunction peripheral, are being provided with an increasing number of functions and are capable of communicating with external apparatuses using various forms of communication, which increases the number of attribute information items.

When address book data is stored on the image forming apparatus, the data is managed by a Management Information Base (MIB) and Simple Network Management Protocol (SNMP) is often used to edit the address book data (addition, deletion, or modification of the attribute information item) from a client apparatus using a computer network. In this situation, each attribute information item for each user included in the address book data is set as an MIB object. To edit the attribute information items for a plurality of users requires communications via SNMP to be performed a number of times that corresponds to the number of attribute information items and the number of users. Therefore, it can take a long time to register or acquire the plurality of attribute information items on the plurality of users.

FIG. 5 (the related art) is a schematic diagram of an example of a process performed when user attribute information items included in a user registration information item for one user are set via SNMP. As illustrated in FIG. 5, the number of steps necessary for communication is great even for one user, which means that it takes a longer time to register user registration information items for a plurality of users.

SUMMARY

The present invention relates to image forming systems and image forming apparatuses and methods which make it possible to collectively register or acquire a plurality of attribute information items for a plurality of users in a reduced period of time.

According to an embodiment of the present invention, an image forming system comprises: an image forming apparatus connected to a computer network; and a client apparatus connected to the computer network.

The image forming apparatus comprises: a data storage device that stores a user registration information item and/or a user group registration information item as address book data; a first communication processing section that receives a registration request message including the user registration information item and/or the user group registration information item; a first message processing section that extracts, when the first communication processing section receives the registration request message from the client apparatus, the user registration information item and/or the user group registration information item specified in the registration request message; and a registration processing section that registers the user registration information item and/or the user group registration information item extracted by the first message processing section in the address book data.

The client apparatus comprises: a second communication processing section that transmits the registration request message; and a second message processing section that causes the second communication processing section to transmit the registration request message to the image forming apparatus.

Additional features and advantages are described herein, and will be apparent from the following Detailed Description and the figures.

BRIEF DESCRIPTION OF THE FIGURES

In the accompanying drawings:

FIG. 3 is an example of a registration request message according to the embodiment of FIG. 1;

FIG. 6 is an example of a registration request message including a plurality of user registration information items according to another embodiment of the present invention; and FIG. 7 is an example of a registration request message including a plurality of user group registration information items according to the embodiment of FIG. 6.

DETAILED DESCRIPTION

Hereinafter, is description of embodiments according to the present invention with reference to the drawings.

Figure 1:
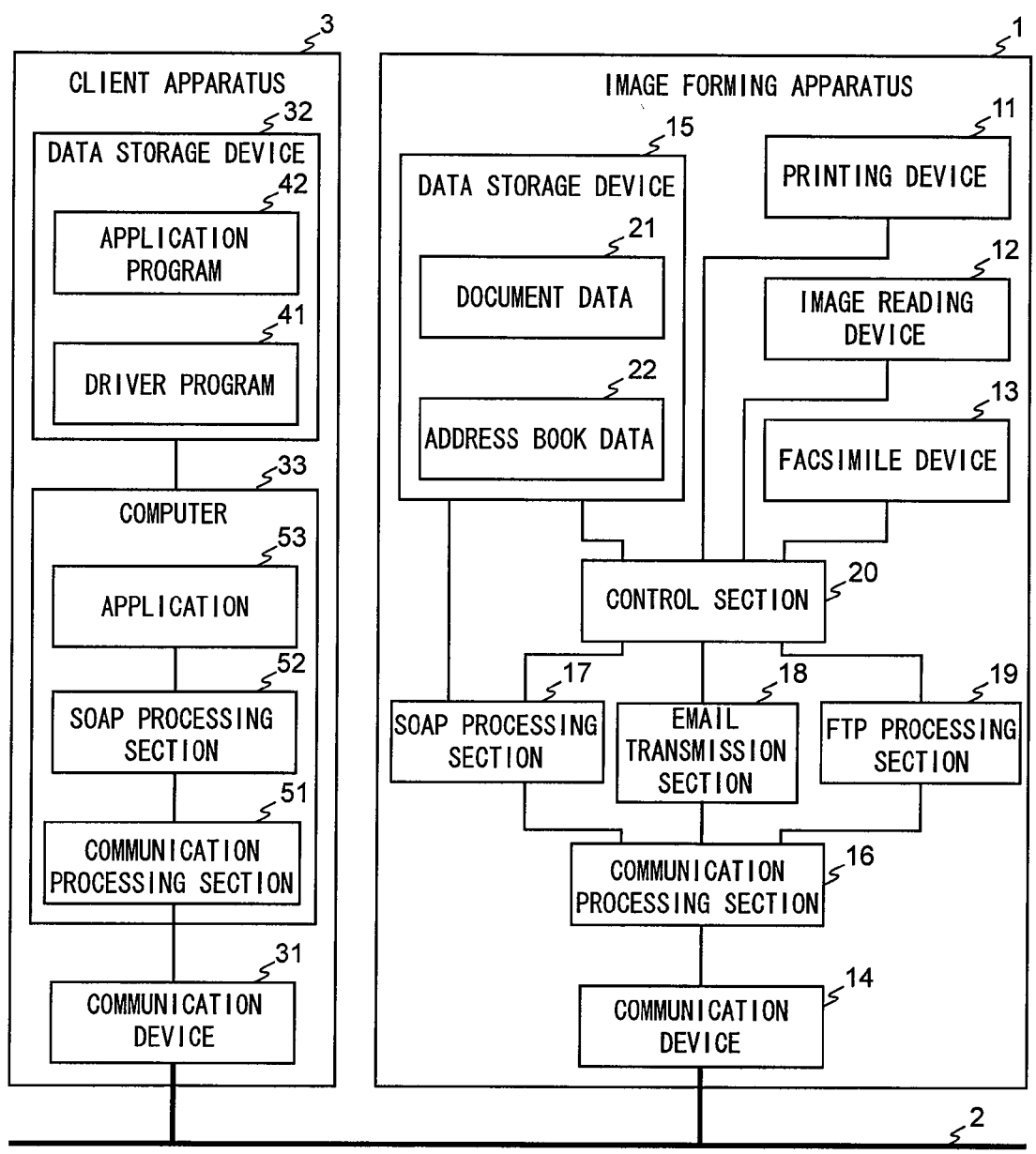
FIG. 1 is a schematic block diagram illustrating an image forming system according to an embodiment of the present invention.

FIG. 1 is a schematic block diagram illustrating the structure of an image forming system according to an embodiment of the present invention. In the image forming system illustrated in FIG. 1, an image forming apparatus 1 is connected to a computer network 2 and a client apparatus 3 is connected to the computer network 2. The image forming apparatus 1 includes at least one of a printing function, an image reading function, or a facsimile transmitting/receiving function. The computer network 2 can be a local area network (LAN) or a wide area network (WAN). The client apparatus 3 can be, for example, a personal computer.

The image forming apparatus 1 includes a printing device 11, an image reading device 12, a facsimile device 13, a communication device 14, a data storage device 15, a communication processing section 16 (an example of a first communication processing section or a communication processing section), a Simple Object Access Protocol (SOAP)

processing section 17 (an example of a first message processing section or message processing section), an email transmission section 18, a File Transfer Protocol (FTP) processing section 19, and a control section 20 (an example of a registration processing section).

The printing device 11 has the functionality to allow it to print a document image based on document data. The image reading device 12 can optically read a document image from a document and generate image data on the document image. The facsimile device 13 can generate a facsimile signal from document data to be transmitted and transmit or receive the facsimile signal and convert the facsimile signal into document data.

The communication device 14 is connected to the computer network 2 and performs data communication with another apparatus (here, the client apparatus 3) connected to the computer network 2. The communication device 14 can be, for example, a network interface card (NIC).

The data storage device 15 stores the document data 21 and address book data 22. The data storage device 15 can be a hard disk drive, a nonvolatile memory, or the like. The document data 21 includes image data generated from image reading performed by the image reading device 12, image data generated from the facsimile signal received by the facsimile device 13, image data for backup of an image printed by the printing device 11, and image data for backup of an image transmitted by the facsimile device 13. The address book data 22 includes user registration information item for each of one or a plurality of users and user group registration information item for each of one or a plurality of user groups.

The user registration information item, for one user, includes a plurality of attribute information items for the user. The user registration information item includes, for example, a user identifier (ID), a user name, an email address, FTP server information, Server Message Block (SMB) server information, and a facsimile number.

The FTP server information includes a path to a user directory on an FTP server, a login name therefor, and a password therefor. The SMB server information includes a path to a user directory on an SMB server, a login name therefor, and a password therefor.

The user group registration information item includes one or a plurality of user identifiers (IDs) belonging to a user group.

The communication processing section 16 controls the communication device 14 allowing data communications through the computer network 2 via Transmission Control Protocol/Internet Protocol (TCP/IP). Further, the communication processing section 16 has a client-server function via Hypertext Transfer Protocol (HTTP).

The SOAP processing section 17 controls the communication processing section 16 so as to allow the transmission/reception of a SOAP message. When the communication processing section 16 receives a registration request message from the client apparatus 3, the SOAP processing section 17 extracts each of a plurality of user registration information items and/or user group registration information items that are specified in the registration request message. Further, the SOAP processing section 17 reads the user registration information item and/or the user group registration information item that are included in the address book data 22, generates an address notification message including the read user registration information item and/or user group registration information item as a SOAP message. And, the SOAP processing section 17 causes the communication processing section 16 to transmit the address notification message to another apparatus (for example, client apparatus 3 or another image forming apparatus) that is connected to the computer network 2.

The registration request message is a SOAP message described in Extensible Markup Language (XML) so as to include the plurality of user registration information items and/or user group registration information items. One user registration information item is described as one element in the registration request message. In the same manner, one user group registration information item is described as one element in the registration request message.

In an embodiment, the HTTP is bound as a lower-layer protocol than the SOAP and the image forming apparatus 1 and the client apparatus 3 each have a URL of an endpoint set in advance. Each transmits the SOAP message by a POST command via HTTP to the endpoint of the communication counterpart.

The email transmission section 18 controls the communication processing section 16 causing email transmission via Simple Mail Transfer Protocol (SMTP).

The FTP processing section 19 controls the communication processing section 16 causing file transfer with respect to the FTP server connected to the computer network 2 via FTP.

The control section 20 controls the internal device, such as the printing device 11, the image reading device 12, or the facsimile device 13, to execute a job requested by the client apparatus 3 or through an operation panel (not illustrated). The control section 20 stores the document data 21 generated in each kind of job in the data storage device 15 and specifies a destination of the document data 21 by referencing the address book data 22. Then, the control section 20 transmits the document data 21 to a destination of either the facsimile device 13, the email transmission section 18, and the FTP processing section 19. The control section 20 registers the user registration information item and/or user group registration information item extracted by the SOAP processing section 17 in the address book data.

It should be noted that the communication processing section 16, the SOAP processing section 17, the email transmission section 18, the FTP processing section 19, and the control section 20 are implemented by a built-in computer (not illustrated) that executes a predetermined program.

The client apparatus 3 includes a communication device 31, a data storage device 32, and a computer 33. The communication device 31 is connected to the computer network 2, and performs communications with another apparatus (here, image forming apparatus 1) connected to the computer network 2. The communication device 31 can be, for example, a NIC.

The data storage device 32 stores a driver program 41 and an application program 42. The data storage device 32 can be a hard disk drive, a nonvolatile memory, or the like. It should be noted that the driver program 41 may be prestored in a portable recording medium, such as a CD-ROM and a drive unit that reads the driver program 41 from the recording medium may be used as the data storage device 32.

The computer 33, which includes a central processing unit (CPU) (not illustrated), a random access memory (RAM) (not illustrated), and a read only memory (ROM) (not illustrated), implements the processing sections by loading a program into the RAM and executing the program by the CPU. The driver program 41 is executed by the computer 33 to thereby implement a communication processing section 51 (an example of a second communication processing section) and a SOAP processing section 52 (an example of a second message processing section). The driver program 41 is an example of a computer program. The application program 42 is executed by the computer 33 to thereby implement an application 53.

The communication processing section 51 controls the communication device 31 so as to cause data communication through the computer network 2 via TCP/IP. The communication processing section 51 has a client-server function via HTTP.

The SOAP processing section 52 controls the communication processing section 51 allowing a transmission/reception of a SOAP message. The SOAP processing section 52 causes the communication processing section 51 to transmit a registration request message to the image forming apparatus 1. In addition, the SOAP processing section 52 acquires an address notification message received by the communication processing section 51 from the image forming apparatus 1. It should be noted that the SOAP processing section 52 may generate the registration request message to be transmitted to the image forming apparatus 1, from the address notification message acquired from another image forming apparatus.

The application 53 requests the image forming apparatus 1 to edit the address book data 22 or acquires a part or an entirety of the address book data 22 by using the SOAP processing section 52.

Next, a description will now be made of the operation of each component of the above-mentioned image forming system.

First will be described the process of registering a plurality of user registration information items and/or user group registration information items in the address book data 22.

Figure 2:
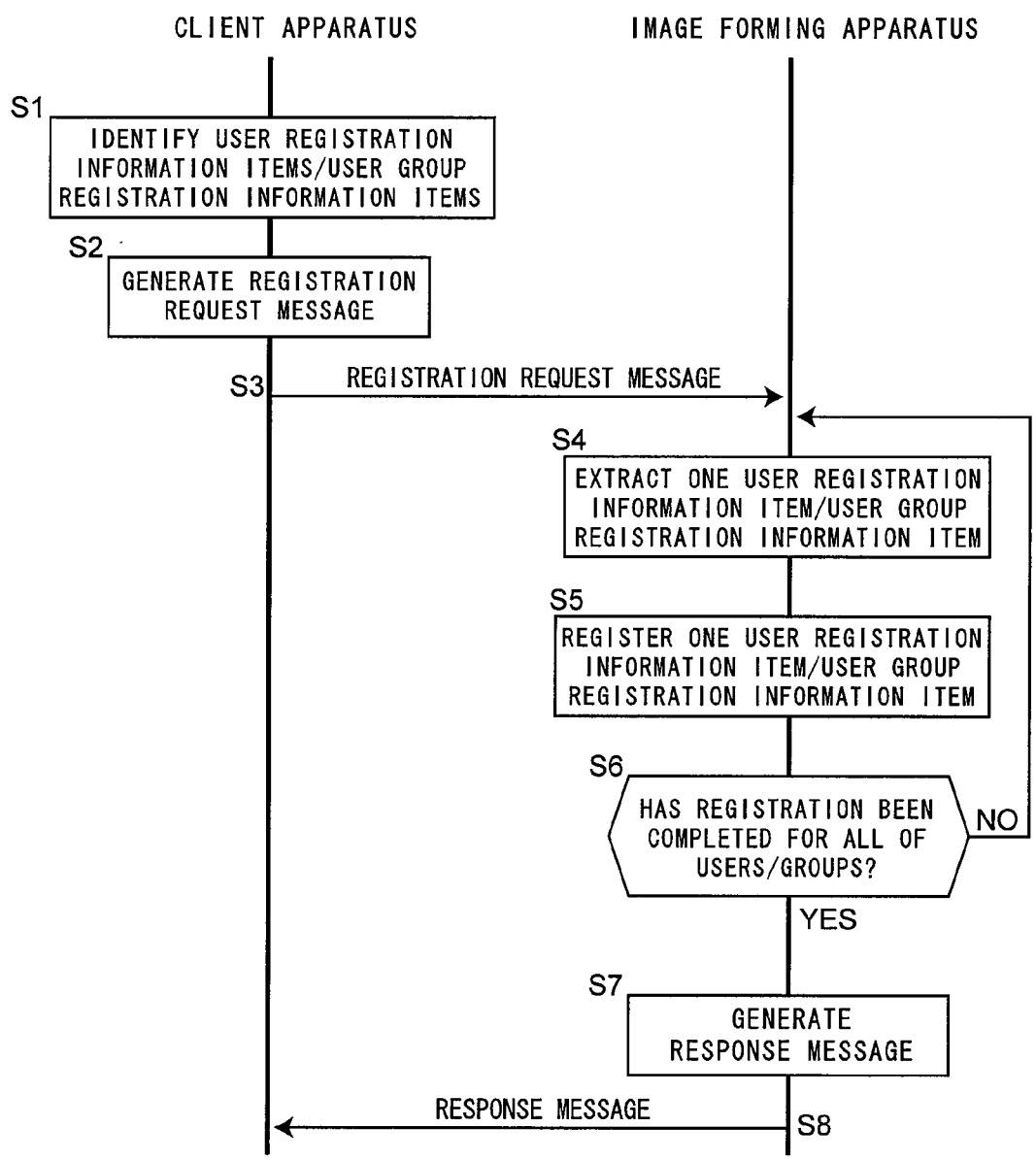
FIG. 2 is a schematic diagram describing the process of registering a plurality of user registration information items and/or user group registration information items in address book data in the image forming system illustrated in FIG. 1.

FIG. 2 is a schematic diagram illustrating the process of registering a plurality of user registration information items and/or user group registration information items in the address book data 22 in the image forming system of FIG. 1.

In this process, on the client apparatus 3, the application 53 identifies the plurality of user registration information items and/or user group registration information items to be registered in the address book data 22 (Step S1). For example, the application 53 causes a display device (not illustrated) to display an input screen having input fields for inputting the plurality of user registration information items and/or user group registration information items, and specifies the plurality of user registration information items and/or user group registration information items to be registered based on values inputted into the input fields through an input device (not illustrated) (such as a keyboard). Alternatively, the application 53 may extract the plurality of user registration information items and/or user group registration information items from existing data file.

Subsequently, the application 53 causes the SOAP processing section 52 to execute a registration request for the plurality of user registration information items and/or user group registration information items. The SOAP processing section 52 generates a registration request message including the plurality of user registration information items and/or user group registration information items to be registered (Step S2).

FIG. 3 is an example of the registration request message according to an embodiment. The registration request message illustrated in FIG. 3 has a SOAP envelope and includes a setAddressBookRequest element in a body element of the SOAP envelope. In addition, an Address element and a Group element are included as child elements of the setAddressBookRequest element.

The Address element, illustrated in FIG. 3, includes a plurality of User elements. One User element includes the user registration information item for one user. In the User element, each attribute information item included in the user registration information item is described as one element. In the User element illustrated in FIG. 3, the user ID is indicated by a UserID element, the user name is indicated by a UserName element, the email address is indicated by an EmailAddress element, the path to the user directory on the FTP server is indicated by an FTPpath element, the login name for the FTP server is indicated by an FTPloginName element, the password for the FTP server is indicated by an FTPloginPassword element, the path to the user directory on the SMB server is indicated by an SMBpath element, the login name for the SMB server is indicated by an SMBloginName element, the password for the SMB server is indicated by an SMBloginPassword element, the facsimile number is indicated by a FacsimileNumber element, and a facsimile communication rate is indicated by a FacsimileRate element.

The Group element, illustrated in FIG. 3, includes a plurality of GroupInfo elements. One GroupInfo element includes one GroupID element that indicates an ID of a user group and the UserID element that indicates the user ID of each of one or a plurality of users belonging to the user group.

It should be noted that although the registration request message illustrated in FIG. 3 includes a plurality of user registration information items and a plurality of user group registration information items, it may be structured so as to include only a plurality of user registration information items or only a plurality of user group registration information items. It may also be structured so as to include one or more user registration information items and one or more user group registration information items.

After generating the registration request message, the SOAP processing section 52 of the client apparatus 3 causes the communication processing section 51 to transmit the registration request message to the image forming apparatus 1 (Step S3).

The communication processing section 51 of the client apparatus 3 transmits the registration request message to the image forming apparatus 1 by a POST command via HTTP. The registration request message is transmitted through the communication device 31, the computer network 2, and the communication device 14, and received by the communication processing section 16 of the image forming apparatus 1. The communication processing section 16 of the image forming apparatus 1 supplies the registration request message received via HTTP to the SOAP processing section 17.

Upon receiving the registration request message, the SOAP processing section 17 parses the registration request message from the beginning, and extracts therefrom one user registration information item or one user group registration information item (Step S4). For example, in the situation of the registration request message illustrated in FIG. 3, one User element or one GroupInfo element is extracted. Subsequently, when the SOAP processing section 17 extracts a user registration information item or a user group registration information item, the control section 20 registers the user registration information item or the user group registration information item in the address book data 22 (Step S5).

Then, the SOAP processing section 17 judges whether or not all of the user registration information items and the user group registration information items included in the registration request message have been extracted (Step S6). If all such items have not been extracted, the SOAP processing section 17 extracts the next user registration information item or the next user group registration information item, and the control section 20 registers the user registration information item or the user group registration information item in the address book data 22. Meanwhile, if all such items have been extracted, the SOAP processing section 17 generates a response message indicating completion of a registration processing in response to the registration request message as a SOAP message (Step S7) and causes the communication processing section 51 to transmit the response message to the client apparatus 3 (Step S8).

The communication processing section 16 of the image forming apparatus 1 transmits the response message to the client apparatus 3 by a POST command via HTTP. The response message is transmitted through the communication device 14, the computer network 2, and the communication device 31, and received by the communication processing section 51 of the client apparatus 3. The communication processing section 51 of the image forming apparatus 1 supplies the response message received via HTTP to the SOAP processing section 52. Upon receipt of the response message, the SOAP processing section 52 notifies the application 53 of the completion of the registration processing.

Accordingly, the plurality of user registration information items and/or user group registration information items are registered in the address book data 22.

The process of acquiring the plurality of user registration information items and/or user group registration information items from the address book data 22 will now be described.

Figure 4:
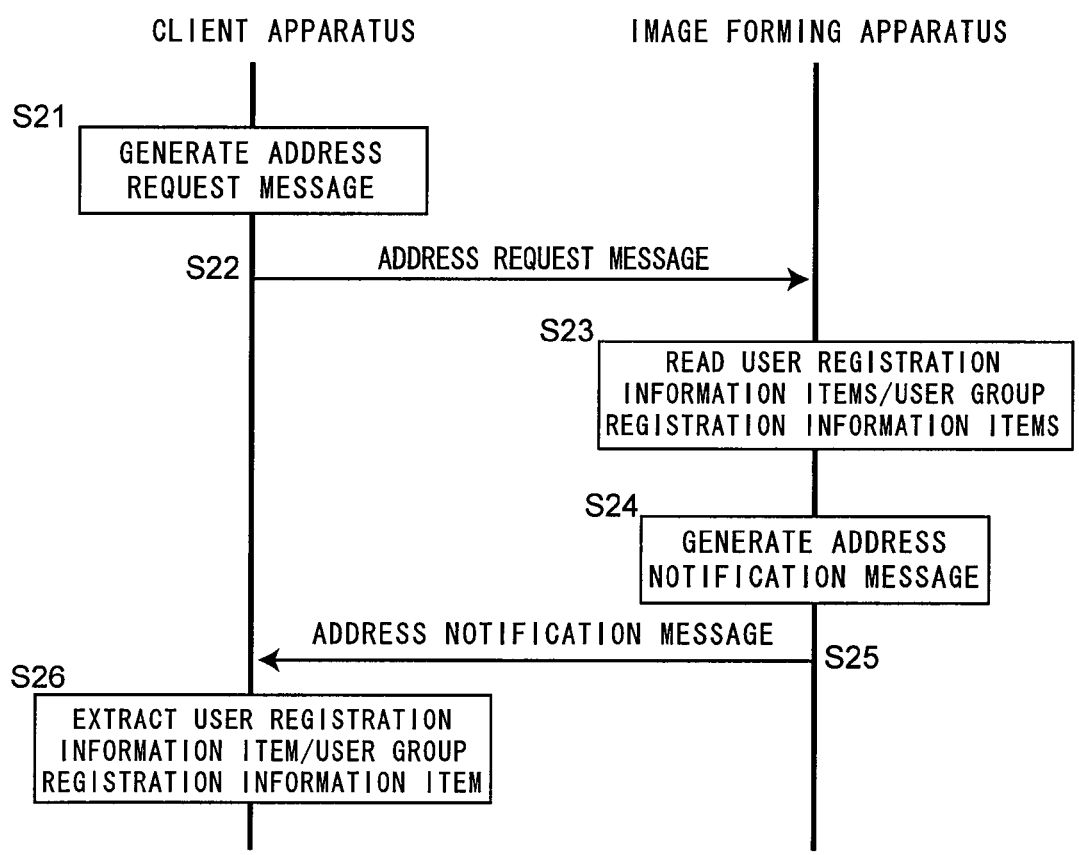
FIG. 4 is a schematic diagram describing the process of acquiring the plurality of user registration information items and/or user group registration information items from the address book data in the image forming system illustrated in FIG. 1.
Figure 5:
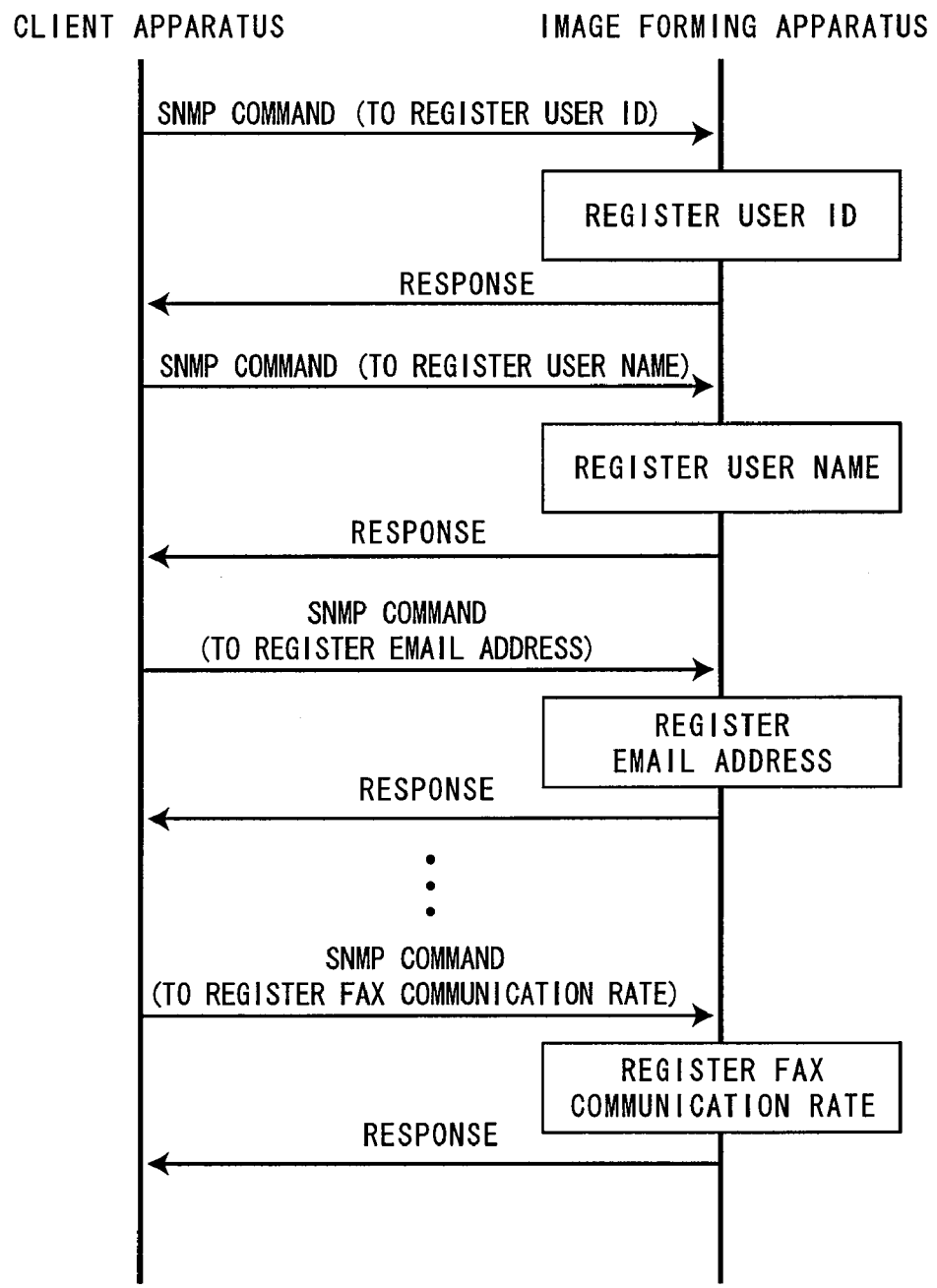
FIG. 5 is a schematic diagram of an example of a process performed when user attribute information items included in a user registration information item for one user are set via SNMP.

FIG. 4 is a schematic diagram illustrating the process of acquiring the plurality of user registration information items and/or user group registration information items from the address book data 22 in the image forming system illustrated in FIG. 1. In this process, within the client apparatus 3, the application 53 causes the SOAP processing section 52 to execute an acquisition request for the plurality of user registration information items and/or user group registration information items that are registered in the address book data 22.

The SOAP processing section 52 generates an address request message as a SOAP message (Step S21), and causes the communication processing section 51 to transmit the address request message to the image forming apparatus 1 (Step S22). The address request message is transmitted from the communication processing section 51 to the communication processing section 16 and supplied to the SOAP processing section 17.

Upon receipt of the address request message, the SOAP processing section 17 of the image forming apparatus 1 reads the plurality of user registration information items and/or user group registration information items from the address book data 22 of the data storage device 15 (Step S23). Then, the SOAP processing section 17 generates the address notification message, including the plurality of user registration information items and/or user group registration information items, for example, as a SOAP message having the same format as the registration request message, as illustrated in FIG. 3 (Step S24).

Then, the SOAP processing section 17 causes the communication processing section 16 to transmit the address notification message to the client apparatus 3 (Step S25). The address notification message is transmitted from the communication processing section 16 to the communication processing section 51, and supplied to the SOAP processing section 52.

The SOAP processing section 52, of the client apparatus 3, extracts the user registration information item and/or user group registration information item from the address notification message, and supplies the user registration information item and/or user group registration information item to the application 53 (Step S26).

Accordingly, the plurality of user registration information items and/or user group registration information items are acquired from the address book data 22 of the image forming apparatus 1.

As described above, the image forming apparatus 1 according to this embodiment includes: the data storage device 15 that stores the user registration information item and/or user group registration information item as the address book data 22; the communication processing section 16 that receives the registration request message described in XML so as to include the plurality of user registration information items and/or user group registration information items; the SOAP processing section 17 that extracts, when the communication processing section 16 receives the registration request message from the client apparatus 3, each of the plurality of user registration information items and/or user group registration information items that are specified in the registration request message; and the control section 20 that registers the user registration information item and/or user group registration information item that are extracted from the SOAP processing section 17 in the address book data 22. The client apparatus 3 includes: the communication processing section 51 that transmits the registration request message; and the SOAP processing section 52 that causes the communication processing section 51 to transmit the registration request message to the image forming apparatus 1.

Accordingly, in one transmission of the registration request message, the image forming apparatus 1 can be supplied with the plurality of user registration information items and/or user group registration information items, making it possible to collectively register the plurality of attribute information items for a plurality of users in the image forming apparatus 1 in a short period of time.

Further, in this embodiment, the user registration information item for one user includes a plurality of attribute information items and one user registration information item is described as one element in the registration request message.

Accordingly, by repeatedly describing elements, the user registration information items for a plurality of users can be described in one registration request message. Meanwhile, on the image forming apparatus 1, the elements only have to be extracted one by one to specify and register the user registration information item for each of the elements. Hence, a single transmission of the registration request message is all the communication that is necessary irrespective of the number of users to be registered on a single occasion.

Further, in this embodiment, the user group registration information item for one user group includes one or a plurality of user IDs and one user group registration information item is described as one element in the registration request message.

Accordingly, by repeatedly describing elements, the user group registration information items for a plurality of user groups can be described in a single registration request message. Meanwhile, on the image forming apparatus 1, the elements only have to be extracted one by one to identify and register the user group registration information item for each of the elements. Hence, a single transmission of the registration request message is all the communication that is necessary irrespective of the number of user groups to be registered on a single occasion.

Further, in this embodiment, the SOAP processing section 17 of the image forming apparatus 1 reads the user registration information item and/or user group registration information item that are included in the address book data 22, generates the address notification message including the user registration information item and/or user group registration information item in the same format as the registration request message, and causes the communication processing section 16 to transmit the address notification message to the apparatus connected to the computer network 2.

Accordingly, in a single transmission of the address notification message, the client apparatus 3 can be provided with the plurality of user registration information items and/or user group registration information items, making it possible to collectively acquire the plurality of attribute information items for a plurality of users from the image forming apparatus 1 in a short period of time.

Further, in this embodiment, when the communication processing section 51 receives the address notification message, the SOAP processing section 52 of the client apparatus 3 causes the communication processing section 51 to transmit the address notification message to another image forming apparatus.

Accordingly, the same address book data as the address book data 22 of the image forming apparatus 1 can be registered in another image forming apparatus in a short period of time.

In another embodiment of the present invention, the user registration information item and the user group registration information item are registered in the address book data 22 by separate registration request messages.

In this embodiment, when the application 53 causes the SOAP processing section 52 to execute a registration request for a plurality of user registration information items, the SOAP processing section 52 generates a registration request message including a plurality of user registration information items to be registered. FIG. 6 is an example of a registration request message including the plurality of user registration information items according to this embodiment. The registration request message illustrated in FIG. 6 has a SOAP envelope and includes a setAddressRequest element in a body element of the SOAP envelope. In addition, a plurality of User elements are included as child elements of the setAddressRequest element. The User elements are the same as those of the previous embodiment.

Further, in this embodiment, when the application 53 causes the SOAP processing section 52 to execute a registration request for a plurality of user group registration information items, the SOAP processing section 52 generates a registration request message including a plurality of user group registration information items to be registered. FIG. 7 is an example of the registration request message including the plurality of user group registration information items according to this embodiment. The registration request message illustrated in FIG. 7 has a SOAP envelope and includes a setGroupRequest element in a body element of the SOAP envelope. In addition, a plurality of GroupInfo elements are included as child elements of the setGroupRequest element. The GroupInfo elements are the same as those of the previous embodiment.

Accordingly, in this embodiment, a registration request for the user registration information item is performed by the SOAP message including the setAddressRequest element and a registration request for the user group registration information item is performed by the SOAP message including the setGroupRequest element.

It should be noted that another configuration and another operation of each component of this embodiment can be the same as those of the previous embodiment.

The present invention includes various other embodiments. For example, other designs can be used in which the above-described components are each performed.

For example, each of the above-described embodiments may be configured so that the SOAP processing section 52 of the client apparatus 3 specifies a group ID in the address request message and the SOAP processing section 17 of the image forming apparatus 1 reads only the user registration information items for users belonging to a group corresponding to the group ID, generates the address notification message, and causes the transmission thereof.

Further, each of the above-described embodiments may be configured so that the SOAP processing section 52 of the client apparatus 3 generates the registration request message to be transmitted to another image forming apparatus from the thus-acquired address notification message. In that situation, the communication processing section 51 transmits the registration request message to the another image forming apparatus that communicates via SOAP and is connected to the computer network 2. This image forming apparatus can have the same structure as the image forming apparatus 1. At least, the SOAP envelope of the address notification message in itself can be used as the SOAP envelope of the registration request message.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image forming system, comprising:
an image forming apparatus connected to a computer network; and
a client apparatus connected to the computer network,
the image forming apparatus comprising:
a data storage device that stores a user registration information item and a user group registration information item as address book data;
a first communication processing section that receives a registration request message that is described in Extensible Markup Language (XML), and includes the plurality of user registration information items for a plurality of users and the plurality of user group registration information items for a plurality of user groups,
wherein one user registration information item includes a plurality of attribute information items, and the plurality of user registration information items for the plurality of users are described by repeatedly describing XML elements of one user registration information item described as one XML element, and
wherein one user group registration information item includes a plurality of user IDs belonging to a user group, and the plurality of user group registration information items for the plurality of user groups are described by repeatedly describing XML elements of one user group registration information item described as one XML element;
a first message processing section that extracts, when the first communication processing section receives the registration request message from the client apparatus, the plurality of user registration information items and the plurality of user group registration information items specified in the registration request message; and
a registration processing section that registers the plurality of user registration information items and the plurality of user group registration information items extracted by the first message processing section in the address book data, the client apparatus comprising:

a second communication processing section that transmits the registration request message; and a second message processing section that causes the second communication processing section to transmit the registration request message to the image forming apparatus.

2. The image forming system according to claim 1, wherein the registration request message comprises a Simple Object Access Protocol (SOAP) message.

3. The image forming system according to claim 1, wherein the registration request message is transmitted by a POST command via Hypertext Transfer Protocol (HTTP).

4. The image forming system according to claim 1, wherein the plurality of attribute information items comprise items selected from the group consisting of a user ID, a user name, an email address, File Transfer Protocol (FTP) server information, Server Message Block (SMB) server information, and facsimile information.

5. The image forming system according to claim 4, wherein the FTP server information comprise items selected from the group consisting of a path to a user directory on an FTP server, a login name therefor, and a password therefor.

6. The image forming system according to claim 4, wherein the SMB server information comprise items selected from the group consisting of a path to a user directory on an SMB server, a login name therefor, and a password therefor.

7. The image forming system according to claim 1, wherein the second message processing section generates an address request message for acquiring the plurality of user registration information items and the plurality of user group registration information items registered in the address book data, and causes the second communication processing section to transmit the address request message to the image forming apparatus.

8. The image forming system according to claim 7, wherein the first message processing section reads the plurality of user registration information items and/or the plurality of user group registration information items included in the address book data, generates an address notification message including the read the plurality of user registration information items and the plurality of user group registration information items, and causes the first communication processing section to transmit the address notification message to the client apparatus.

9. The image forming system according to claim 8, comprising another image forming apparatus connected to the computer network, wherein:

when the second communication processing section receives the address notification message, the second message processing section of the client apparatus causes the second communication processing section to transmit the address notification message to the another image forming apparatus.

10. An image forming apparatus, which is capable of communicating with a client apparatus through a computer network, comprising:

a data storage device that stores a user registration information item and a user group registration information item as address book data;

a communication processing section that receives a registration request message that is described in Extensible Markup Language (XML), and includes the plurality of user registration information items for a plurality of users and the plurality of user group registration information items for a plurality of user groups, wherein one user registration information item includes a plurality of attribute information items, and the plurality of user registration information items for the plurality of users are described by repeatedly describing XML elements of one user registration information item described as one XML element, and wherein one user group registration information item includes a plurality of user IDs belonging to a user group, and the plurality of user group registration information items for the plurality of user groups are described by repeatedly describing XML elements of one user group registration information item described as one XML element;

a message processing section that extracts, when the communication processing section receives the registration request message from the client apparatus, the plurality of user registration information items and the plurality of user group registration information items that are specified in the registration request message; and a registration processing section that registers the plurality of user registration information items and the plurality of user group registration information items that are extracted by the message processing section in the address book data.

11. The image forming apparatus according to claim 10, wherein the registration request message comprises a Simple Object Access Protocol (SOAP) message.

12. The image forming apparatus according to claim 10, wherein the message processing section reads the plurality of user registration information items and the plurality of user group registration information items included in the address book data, generates an address notification message including the read the plurality of user registration information items and the plurality of user group registration information items, and causes the communication processing section to transmit the address notification message to the client apparatus.

13. The image forming apparatus according to claim 12, wherein the address notification message comprises a Simple Object Access Protocol (SOAP) message and is described in XML.

14. A method of operating an image forming system, comprising:

connecting an image forming apparatus to a client apparatus via a computer network;

storing on the image forming apparatus a user registration information item and/or a user group registration information item as address book data;

via the image forming apparatus receiving a registration request message including the plurality of user registration information items for a plurality of users and the plurality of user group registration information items for a plurality of user groups, wherein one user registration information item includes a plurality of attribute information items, and the plurality of user registration information items for the plurality of users are described by repeatedly describing Extensible Markup Language (XML) elements of one user registration information item described as one XML element, and wherein one user group registration information item includes a plurality of user IDs belonging to a user group, and the plurality of user group registration information items for the plurality of user groups are described by repeatedly describing XML elements of one user group registration information item described as one XML element;

extracting the plurality of user registration information items and the plurality of user group registration information items specified in the registration request message;

registering the extracted plurality of user registration information items and the plurality of user group registration information items in the address book data, via the client apparatus transmitting the registration request message to the image forming apparatus.

\* \* \* \* \*